June 19, 1945.  C. H. LISTER  2,378,418
FRESH FRUIT TREATING MACHINE
Filed July 31, 1942  2 Sheets—Sheet 1
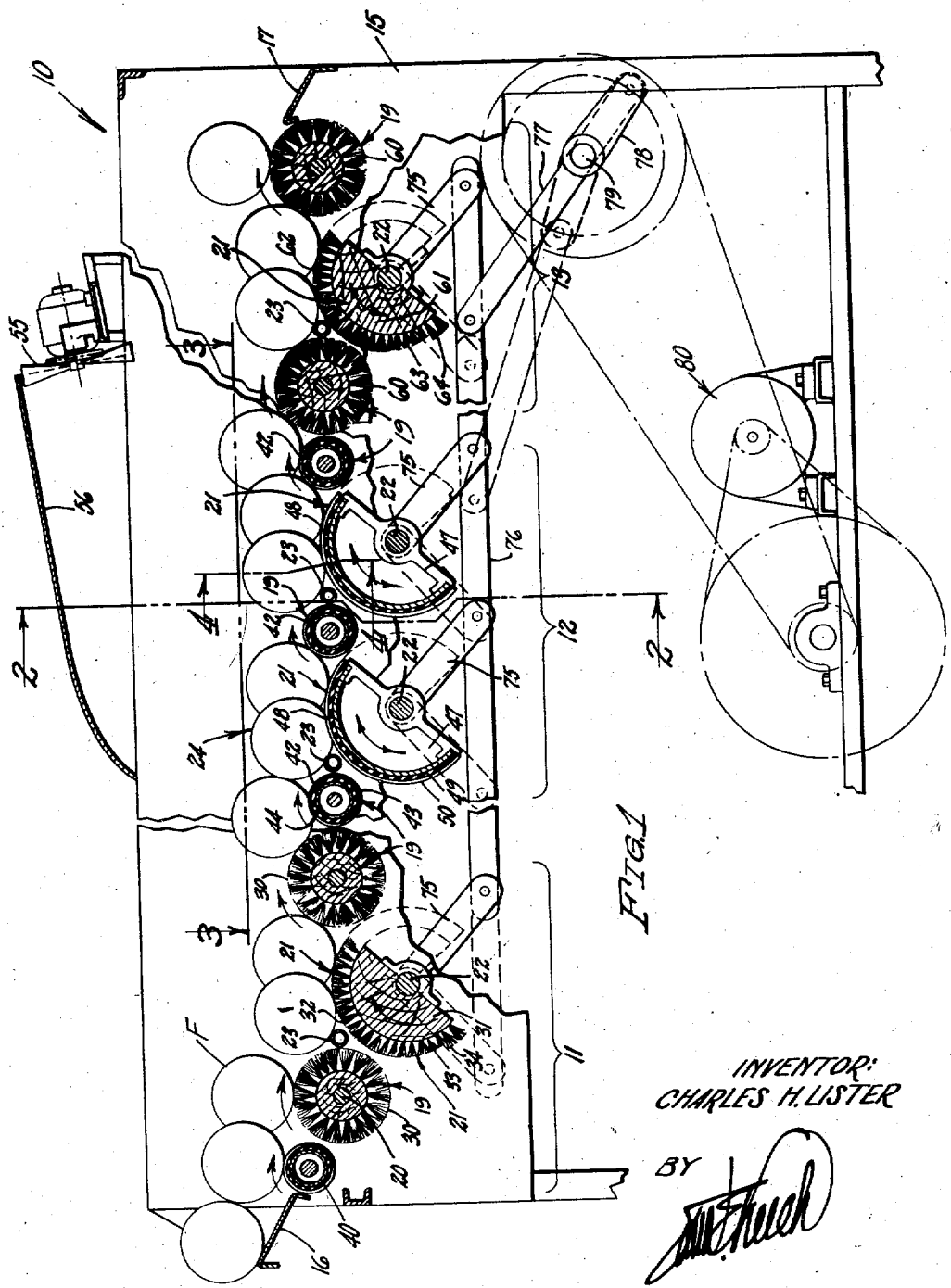
INVENTOR:
CHARLES H. LISTER
BY
ATTORNEY June 19, 1945.  C. H. LISTER  2,378,418
FRESH FRUIT TREATING MACHINE
Filed July 31, 1942   2 Sheets-Sheet 2

INVENTOR:
CHARLES H. LISTER
BY
ATTORNEY

Patented June 19, 1945

2,378,418

UNITED STATES PATENT OFFICE 2,378,418

FRESH FRUIT TREATING MACHINE

Charles H. Lister, Oldsmar, Fla.

Application July 31, 1942, Serial No. 453,003

12 Claims. (Cl. 146—202)

This invention relates to the art of treating fresh fruit and vegetables in preparing the same for market and is especially useful in treating citrus fruits such as oranges and grapefruit.

In the packing of oranges and grapefruit the practice is followed of washing and then mechanically drying surface moisture from the washed fruit before sizing and packing the fruit in shipping cases.

It is an object of the present invention to provide a novel machine which will rapidly wash, dry and polish citrus fruits, as well as any other kind of round or globular shaped fruit or vegetable.

It is another object of the invention to provide such a machine which will operate on the fruit by a gentle, scrubbing motion whereby the rinds or skins of the articles being treated may be washed, dried or polished without being injured.

It is another object of the invention to provide a novel fruit treating machine of the transverse type, that is, in which the fruit is passed over a series of transversely disposed treating elements and treated in troughs formed between these elements.

The manner of accomplishing the foregoing objects as well as other objects and advantages will be made manifest in the following description taken in connection with the accompanying drawings in which Fig. 1 is a diagrammatic, longitudinal, sectional view of a preferred embodiment of the invention.

Figure 3:
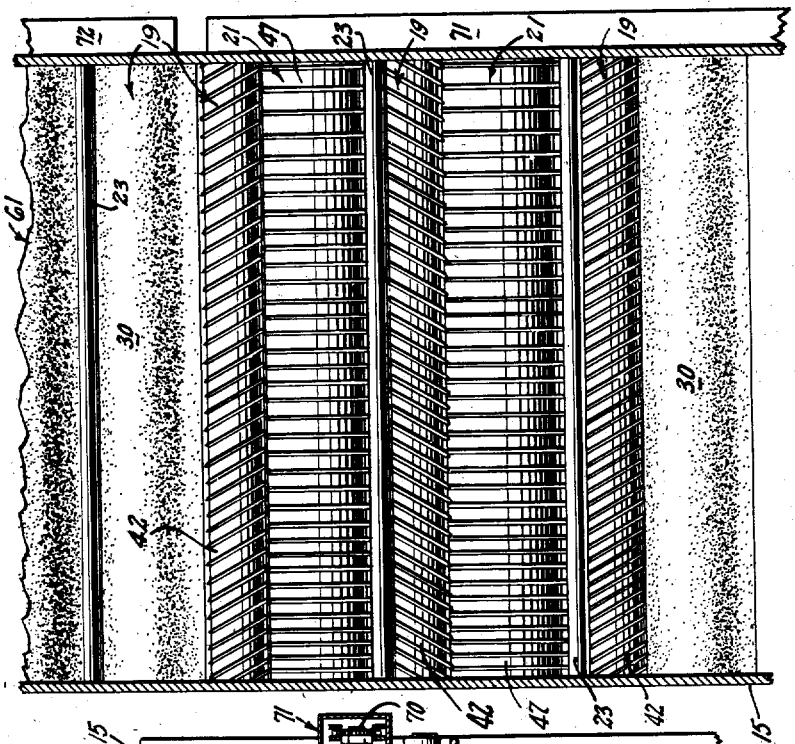
Fig. 3 is a diagrammatic, horizontal, sectional view taken on the line 3—3 of Fig. 1.
Figure 2:
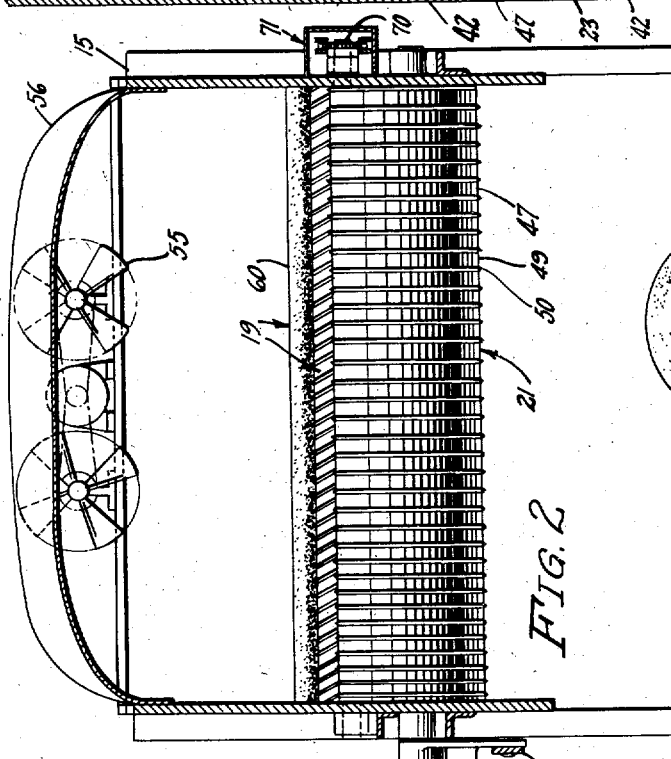
Fig. 2 is a diagrammatic, transverse, sectional view taken on the line 2—2 of Fig. 1.

Referring specifically to the drawings, the machine 10, illustrated therein, comprises a combination of a washer 11, a water eliminator 12, and a polisher 13. The machine 10 has a frame 15 on which is mounted a receiving drop board 16 and a discharge drop board 17. Mounted on the frame 15 between the drop boards 16 and 17 are a series of transverse rotary fruit treating elements 19 having shafts 20, rocking fruit treating members 21 having shafts 22, and small idle rollers 23, all of which unite to provide a fruit treating bed 24.

The washer 11 is for washing fruit F fed into the machine 10; the water eliminator 12 is for drying this fruit F and the polisher 13 is for producing a polished surface on the washed and dried fruit. As indicated by the breaks of Fig. 1, each of these three sections of the machine 10 is considerably longer than the portion thereof illustrated in this figure, the length of these respective divisions of the machine 10 varying in accordance with the volume of fruit which the machine is designed for treating.

In the washer 11 the treating elements 19 preferably comprise a series of parallel cylindrical fiber brushes 30 between each adjacent pair of which a rocking member 21 is mounted this being in the form of a substantially semi-cylindrical fiber brush 31 having a fruit brushing surface 32 the radius of which is larger than that of the brushes 30. The surface 32 preferably has a depression 33 cut therein to provide a shoulder 34 in the brush bristles along the edge of the surface 32 disposed towards the fruit receiving end of the machine 10. The purpose of these details will be made clear hereinafter. The axis of the brush 31 is disposed well below the axes of the brushes 30 and substantially equi-distant therefrom.

The juxtaposition of the cylindrical brushes 30 and the semi-cylindrical brushes 31 provides a pair of fruit treating troughs, one of which is formed between the brushing surface 32 and each of the cylindrical brushes 30. One of the small rollers 23 is mounted on the frame 15 so as to lie within that trough (of each such pair) which is located towards the fruit receiving end of the machine.

It is to be understood that there may be any number of cylindrical fiber brushes 30 in the washer 11 and that each adjacent pair of these has associated with it a semi-cylindrical fiber brush 31 and small roller 23 as shown in Fig. 1. While the first of the brushes 30 may be placed right next to the fruit receiving board 16, it is found preferable to use a power driven rubber covered roller 40 in between this brush roll and drop board 16 to assure gentle delivery of fruit from the drop board onto the first brush 30 of the washer 11.

The water eliminator 12 receives fruit directly from the washer 11 and the elements 19 of the eliminator comprise cylindrical rollers 42 which are preferably covered with sheet rubber 43 having ribs 44 thereon, these ribs being pitched to extend spirally about the roller from one end to the other thereof. Disposed in between each adjacent pair of the equally spaced rollers 42 and the eliminator 12 is a member 21 which comprises a semi-cylindrical half roller 47, having a semi-cylindrical surface 48 which is provided preferably with a rubber covering 49 having ribs 50, the latter preferably being in planes disposed at right angles to the axis of the half roller 47. It is to be noted that the diameter of the rollers 42 is considerably less than that of the brushes 30 and very much less than the diameter of the half rollers 47.

For a purpose to be explained later, the spiral rubber ribs or threads provided on the surfaces of adjacent rollers 42 are oppositely pitched.

Each half roller 47 cooperates with each of the adjacent rollers 42 to form a fruit treating trough, that one of these troughs which is located nearest the receiving end of machine 10 having one of the small rollers 23 located therein.

The water eliminator 12 also has a pair of electrically driven fans 55 mounted thereabove in a hood 56 for directing air from these fans downwardly onto fruit F travelling through the eliminator.

The polisher 13 receives fruit directly from the eliminator 12 and includes a series of rotary fruit treating elements 19 which comprise cylindrical hair brushes 60. Mounted between each adjacent pair of brushes 60 in this series is a rocking member 21 comprising a semi-cylindrical hair brush 61 having a semi-cylindrical fruit treating surface 62, the latter being cut away to provide a recess 63 terminating in a shoulder 64 along the edge of this brush disposed toward the receiving end of machine 10. The surface 62 of each semi-cylindrical brush 61 cooperates with each of the adjacent rollers 60 to provide a fruit treating trough, the trough of each such pair which is disposed toward the fruit receiving end of the machine having located therein one of the small rollers 23.

The final cylindrical brush 60 of the series of these in the polisher 13 is disposed right next to the discharge drop board 17 so that fruit passing over this brush is gently delivered to the board 17 and over this out of the machine 10 onto a conveyor belt or other suitable piece of equipment (not shown) which is placed there to receive it.

The shafts 20 of all of the fruit treating elements 19 are provided with sprockets 70, these sprockets of the elements 19 in the washer 11 and water eliminator 12 being engaged by a chain drive mechanism 71 which continuously rotates these elements in the direction indicated by the arrows in Fig. 1 at a rate which may vary according to conditions but which is preferably about 110 R. P. M. The roller 40 is also driven by the mechanism 71 at the same R. P. M. and in the direction indicated. The sprockets 70 of the rotary elements 19 in the polisher 13 are engaged and driven by a chain drive mechanism 72 at a rate which is higher than that at which the other elements 19 are driven and is preferably about 210 R. P. M.

Each of the shafts 22 of the rocking fruit treating members 21 has an arm 75, these arms being joined by links 76, one of which is connected by a pitman 77 with a crank 78 on a shaft 79 which is rotated by a prime mover 80 so as to repeatedly reciprocate the rocking members 21 between the positions in which they are shown in full lines in Fig. 1 and their dotted line positions in this figure.

While the speed at which the members 21 may be rocked varies over a considerable range it is preferable in the machine disclosed herein that these be actuated at the rate of 90 reciprocations per minute.

Operation

Fruit is delivered to the machine 10 in a fairly constant stream by a conveyor (not shown) from which the fruit rolls onto the receiving drop board 16. Riding over the roller 40 and the first of the brush rollers 30, the fruit comes to rest temporarily in one or the other of the troughs formed between the first pair of brushes 30 and the semi-cylindrical brush 31 disposed therebetween. Water or soap solution is preferably sprayed over all the washer brushes as by spray nozzles (not shown) so that the fruit gets a thorough wet scrubbing by these brushes while disposed in the washer.

When any two treating troughs between adjacent brushes 30 become filled with fruit F, contact with this fruit of the brush shoulder 34 on the brush 31 disposed therebeneath as this shoulder rides upwardly with the forward rocking of this brush, tends to stop the rotation of the fruit and presses it against the leading brush 30 of this pair so as to cause this fruit to ride upwardly and over this brush into the next treating trough therebeyond.

The shoulders 64 on the semi-cylindrical hair brushes 61 of the polisher 13 likewise assists in the movement of fruit through the polisher. It is not necessary to place dependence upon the action of these shoulders for causing a flow of the fruit through the machine, however. This is ordinarily taken care of adequately by pressure of incoming fruit displacing fruit already in the space between the first adjacent pair of brushes 30, thereby causing the displaced fruit to travel over and into the next interval between adjacent brushes, this displacing fruit there which passes to the third such interval, and so on, until a corresponding quantity of fruit has been dislodged from the last interval between brushes 60 in the polisher 13 and is discharged from the machine 10.

This method of causing fruit to progress through a transverse fruit treating machine was first disclosed and claimed in U. S. Letters Patent to Lloyd E. Jones, No. 1,957,964, issued May 8, 1934, on a "Method and apparatus for treating fruit and the like."

It is of course possible and sometimes desirable to provide mechanical means for causing the fruit to progress through the machine which will clean out all the fruit from the machine when the feeding is stopped. Such a means might be effected by providing all the half rollers 21 with shoulders such as the shoulders 34 and 64 on the half roller brushes 30 and 60. Other mechanical clean outs suitable for this purpose are shown in the patents to Lloyd E. Jones, 1,946,022 or 1,956,023, issued Feb. 6, 1934.

Pitching the rubber ribs 44 on adjacent rollers 42 so that these have an angular relation with the ribs 50 on the half rollers 47 effects a squeegeeing of water from the surface of the fruit in the eliminator. The water thus removed from the fruit readily runs along the roller surfaces between these ribs until it drips downwardly from the half rollers 47 and, on the rollers 42, is carried by the helical ribs 44 in droplets hanging therefrom until discharged at the roller ends.

The pitching of the ribs 44 in opposite directions on adjacent rollers 42 is made necessary by the tendency of the spiral threads to cause the fruit to move laterally in the machine.

Oppositely pitching the ribs of the adjacent rolls 42 keeps the fruit properly distributed across the eliminator.

Figure 4:
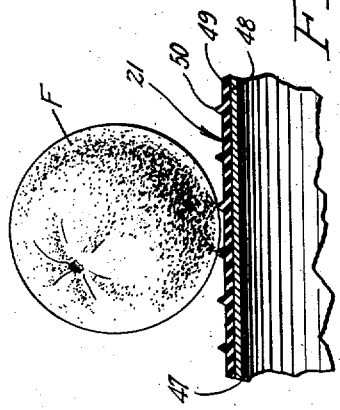
Fig. 4 is an enlarged, detailed, sectional view taken on the line 4—4 of Fig. 1.

The manner in which the rubber ribs in the eliminator engage the fruit is illustrated in Fig. 4. This shows how these ribs are preferably high enough and close enough together to prevent the surface of the fruit being handled touching the roll covering between the ribs, yet they are far enough apart to provide drainage for the water squeegeed from the fruit.

The squeegeeing action in the eliminator 12 removes practically all the free moisture from the outer surfaces of the fruit F. The traces of moisture not thus removed are evaporated by the air from the fans 55 or dispersed by the first of the brushes 60 of the polisher 13.

The rinds of citrus fruits have a certain amount of natural wax on the surface some of which is necessarily removed in the washing process. It is the function of the polisher 13 to spread the remaining wax over the rind surfaces to give the fruit a bright appearance. If desired, a suitable wax such as paraffin may be applied to the brushes of the polisher from which it is transferred to the fruit surfaces. This added wax amplifies the natural wax and produces a better wax coating of the fruit than can be produced with the natural wax alone. The polisher brushes of course spread the paraffin out thin so the fruit surface takes on a high lustre.

While the broad idea of my invention might be used in other combinations than that in which it is shown here, it is especially applicable to machines operating on the transverse principle which permits large quantities of fruit to be treated in a continuously flowing stream.

It is to be noted that each of the valleys containing one of the small diameter idle rollers 23 is formed by one of the members 21 and an element 19 which rotates downwardly toward this member. The small diameter idle roller 23 in each of these valleys supports the fruit resting therein so that this fruit can not be pinched by the converging motion of the element 19 and member 21 forming this valley.

While it is preferable to use idle rollers 23 to perform this function, stationary bars might be substituted for the rollers 23 and adjustably mounted on the frame 15 to permit them to be set at various depths in the valleys in which they are located to selectively vary the degree of scrubbing action to which the fruit resting in said valleys would be subjected. Such bars, if used, could be of smaller diameter than the idle rollers 23 and be placed deeper in said valleys so that the fruit resting in said valleys would simultaneously contact the element 19 and member 21 cooperating to form said valley.

The action thus produced should be provided in the machine of my invention, and particularly in the washer 11, where a relatively severe degree of scrubbing is desired, as where the fruit is affected with scale.

The shoulders 34 and 64 may, if desired, be located nearer the right hand edges of the members 21 than shown in the drawings so as to give a stronger kick to fruit resting in the troughs above said members and thus more effectively aid the fruit F to progress through the machine.

What I claim is:

1. In a fresh fruit treating machine, the combination of: a rotary element having a substantially cylindrical fruit treating surface concentric with the axis of rotation; a member mounted for rocking about an axis parallel with the aforesaid axis of said element, said member having a substantially semi-cylindrical fruit treating surface which is substantially concentric with said rocking axis, the latter being disposed below the axis of said element, and with said surfaces in substantially uniform closely-spaced relation to form a fruit treating trough between said element and said member; relatively closely spaced rubber ribs provided on the surfaces of said element and said member, the ribs on said element being angularly disposed relative to the ribs on said member; and means for rotating said element and rocking said member about their respective axes to effect a rubbing of said fruit in said trough.

2. In a fresh fruit treating machine, the combination of: a rotary element having a substantially cylindrical fruit treating surface concentric with the axis of rotation; a member mounted for rocking about an axis parallel with the aforesaid axis of said element, said member having a substantially semi-cylindrical fruit treating surface which is substantially concentric with said rocking axis, the latter being disposed below the axis of said element, and with said surfaces in substantially uniform closely-spaced relation to form a fruit treating trough between said element and said member; relatively closely spaced rubber ribs provided on the surfaces of said element and said member, the ribs on said element being angularly disposed relative to the ribs on said member; means for rotating said element and rocking said member about their respective axes to effect a rubbing of said fruit in said trough, said element being rotated in a direction to cause the surface thereof adjacent said trough to travel downwardly toward said member; and means located in said trough to limit the distance to which fruit may be drawn into said trough.

3. In a fresh fruit treating machine, the combination of: a rotary element having a substantially cylindrical fruit treating surface concentric with the axis of rotation; a member mounted for rocking about an axis parallel with the aforesaid axis of said element, said member having a substantially semi-cylindrical fruit treating surface which is substantially concentric with said rocking axis, the latter being disposed below the axis of said element, and with said surfaces in substantially uniform closely-spaced relation to form a fruit treating trough between said element and said member; means for rotating said element and rocking said member about their respective axes to effect a rubbing of said fruit in said trough, said element being rotated in such a direction that the surface thereof adjacent said trough travels upwardly away from said member; and a shoulder formed on said member which is caused to travel toward and away from said trough by the rocking of said member and being adapted to engage fruit in said trough to assist in feeding said fruit over said element.

4. In a fresh fruit treating machine, the combination of: a pair of rotary elements having substantially cylindrical fruit treating surfaces concentric with their axes of rotation, said elements being mounted in parallel spaced relation; a member mounted between said elements for rocking about an axis which is parallel with and substantially equi-distant from the axes of said elements, said member having a substantially semi-cylindrical fruit treating surface which is substantially concentric with said rocking axis, there being a pair of fruit treating troughs thus formed between said member and said elements; relatively closely spaced rubber ribs provided on the surfaces of said elements and said member, the ribs on said elements being angularly disposed relative to the ribs on said member; and means for rotating said elements and rocking said member about their respective axes to treat fruit resting in said troughs.

5. In a fresh fruit treating machine, the combination of: a pair of rotary elements having substantially cylindrical fruit treating surfaces concentric with their axes of rotation, said elements being mounted in parallel spaced relation; a member mounted for rocking about an axis which is parallel with, below, and substantially equi-distant from the axes of said elements, said member having a substantially semi-cylindrical fruit treating surface which is substantially concentric with said rocking axis, and disposed below the upwardly turned portions of the fruit treating surfaces of said elements there being a pair of fruit treating troughs thus formed between said member and said elements; means for rotating said elements and rocking said member about their respective axes to treat fruit resting in said troughs; and means for feeding fruit transversely over said elements and said member, said fruit being fed and said elements being rotated in the same direction, and the valley formed by the difference in elevation between the treating surfaces of said elements and said member being sufficiently shallow so that fruit fed into said machine causes fruit already there to progress from said valley and over the element rotating away from said member.

6. In a fresh fruit treating machine, the combination of: a series of fruit treating elements rotatably mounted upon axes disposed in fixed parallel spaced relation, each of said elements having a substantially cylindrical surface concentric with its axis of rotation; a series of rocking members one of which is provided in the space between each adjacent pair of the aforesaid elements, each such member being mounted for rocking about an axis parallel with the aforesaid axes of said elements, said member having a substantially semi-cylindrical fruit treating surface which is substantially concentric with its rocking axis, the latter being disposed below the axes of said pair of said elements so that the uppermost point on said surface of said member is at all times below the uppermost points of said parallel elements between which said member is mounted; means for rotating said elements in a common direction and for rocking said rocking members; and means for feeding fruit transversely over said elements and members, said elements being rotated in a common direction corresponding to that in which said fruit is thus fed, the difference in elevation of the uppermost points on the surfaces of said elements and said members being such that incoming fruit is effective to cause a progressive movement of fruit already in said machine over said elements in the direction of rotation thereof.

7. A combination as in claim 4 in which said fruit treating elements are rotated at a relatively high speed in the same direction; and a bar provided in the trough between said member and the fruit treating element rotating downwardly towards said member to prevent fruit in said trough being pinched.

8. In a fresh fruit treating machine, the combination of: a series of fruit treating elements rotatably mounted about axes disposed in fixed parallel spaced relation, each of said elements having a substantially cylindrical surface concentric with its axis of rotation; a series of rocking members one of which is provided in the space between each adjacent pair of the aforesaid elements, each such member being mounted for rocking about an axis parallel with the aforesaid axes of said elements and having a fruit treating surface substantially concentric with its axis and disposed upwardly therefrom to cooperate with the elements adjacent thereto to form fruit treating troughs; means for rotating said elements so that their upper surfaces travel uniformly in a given direction and for rocking said members about their axes; a series of bars one of which is disposed in the trough between each member and the element adjacent thereto the surface of which travels downwardly towards said member; and means for feeding fruit transversely across said elements and members to cause said fruit to be treated in said troughs by frictional contact of said elements and said members therewith.

9. In a fresh fruit treating machine, the combination of: a series of fruit treating elements rotatably mounted about axes disposed in fixed parallel spaced relation, each of said elements having a substantially cylindrical surface concentric with its axis of rotation; a series of rocking members one of which is provided in the space between each adjacent pair of the aforesaid elements, each such member being mounted for rocking about an axis parallel with the aforesaid axes of said elements and having a fruit treating surface substantially concentric with its axis and disposed upwardly therefrom to cooperate with the elements adjacent thereto to form fruit treating troughs, the axes of said members being disposed at a lower level than the axes of said elements and the surfaces of said members substantially exceeding in radius those of said elements; means for rotating said elements so that their upper surfaces travel uniformly in a given direction and for rocking said members about their axes; a series of bars one of which is disposed in the trough between each member and the element adjacent thereto the surface of which travels downwardly towards said member; and means for feeding fruit transversely across said elements and members to cause said fruit to be treated in said troughs by frictional contact of said elements and said members therewith.

10. In a fresh fruit treating machine, the combination of: a series of fruit treating elements rotatably mounted about axes disposed in fixed parallel spaced relation, each of said elements having a substantially cylindrical surface concentric with its axis of rotation; a series of rocking members one of which is provided in the space between each adjacent pair of the aforesaid elements, each such member being mounted for rocking about an axis parallel with the aforesaid axes of said elements and having a fruit treating surface substantially concentric with its axis and disposed upwardly therefrom to cooperate with the elements adjacent thereto to form fruit treating troughs, the axes of said members being disposed at a lower level than the axes of said elements and the surfaces of said members substantially exceeding in radius those of said elements, the uppermost points on the surfaces of said members being at all times below the uppermost points on the surfaces of said elements; means for rotating said elements so that their upper surfaces travel uniformly in a given direction and for rocking said members about their axes; a series of bars one of which is disposed in the trough between each member and the element adjacent thereto the surface of which travels downwardly towards said member; and means for feeding fruit transversely across said elements and members to cause said fruit to be treated in said troughs by frictional contact of said elements and said members therewith.

11. A fruit treating machine comprising a pair of fruit treating rolls arranged in parallel relation for rotation about stationary axes, means for rotating said rolls in a common direction to aid in feeding the fruit in a direction transversely of the axes of said rolls, a fruit support mounted between said rolls and having an upwardly disposed arcuate surface cooperating with said rolls to form a pair of valleys in which pieces of fruit may be supported upon adjacent surfaces of said rolls and support, means for imparting oscillatory rotative motion to said support about an axis concentric with its arcuate surface disposed parallel with and below the axes of said rolls, and a barrier disposed in the valley between said support and that one of said rolls whose upper surface travels toward the support whereby to prevent the fruit from being wedged between the last mentioned roll and the support when the latter is oscillated to move its surface toward the downwardly travelling surface of said last mentioned roll, said support when moved in the opposite direction aiding the advancement of the fruit over the other of said rolls.

12. A fruit treating machine comprising a pair of fruit treating rolls arranged in parallel relation for rotation about stationary axes, means for rotating said rolls in a common direction to aid in feeding the fruit in a direction transversely of the axes of the rolls, a fruit support mounted between said rolls and having an upwardly disposed arcuate surface cooperating with said rolls to form a pair of valleys in which pieces of fruit may be supported upon adjacent surfaces of said rolls and support, said support being mounted for rotative motion about an axis concentric with its arcuate surface disposed parallel with and below the axes of said rolls, means for imparting oscillatory rotative motion to said support, one direction of which is opposite to the direction of rotation of said rolls, and a barrier disposed in the valley between said support and that one of said rolls whose upper surface travels toward the support whereby to prevent the fruit from being wedged between the approaching surfaces of last mentioned roll and the support.

CHARLES H. LISTER.

CERTIFICATE OF CORRECTION.

Patent No. 2,378,418.   June 19, 1945.

CHARLES H. LISTER.

It is hereby certified that error appears in the printed specification of the above numbered patent requiring correction as follows: Page 2, second column, line 57-58, for the patent number "1,956,023" read --1,946,023--; and that the said Letters Patent should be read with this correction therein that the same may conform to the record of the case in the Patent Office.

Signed and sealed this 9th day of October, A. D. 1945.

Leslie Frazer (Seal)          First Assistant Commissioner of Patents.

is disposed in the trough between each member and the element adjacent thereto the surface of which travels downwardly towards said member; and means for feeding fruit transversely across said elements and members to cause said fruit to be treated in said troughs by frictional contact of said elements and said members therewith.

11. A fruit treating machine comprising a pair of fruit treating rolls arranged in parallel relation for rotation about stationary axes, means for rotating said rolls in a common direction to aid in feeding the fruit in a direction transversely of the axes of said rolls, a fruit support mounted between said rolls and having an upwardly disposed arcuate surface cooperating with said rolls to form a pair of valleys in which pieces of fruit may be supported upon adjacent surfaces of said rolls and support, means for imparting oscillatory rotative motion to said support about an axis concentric with its arcuate surface disposed parallel with and below the axes of said rolls, and a barrier disposed in the valley between said support and that one of said rolls whose upper surface travels toward the support whereby to prevent the fruit from being wedged between the last mentioned roll and the support when the latter is oscillated to move its surface toward the downwardly travelling surface of said last mentioned roll, said support when moved in the opposite direction aiding the advancement of the fruit over the other of said rolls.

12. A fruit treating machine comprising a pair of fruit treating rolls arranged in parallel relation for rotation about stationary axes, means for rotating said rolls in a common direction to aid in feeding the fruit in a direction transversely of the axes of the rolls, a fruit support mounted between said rolls and having an upwardly disposed arcuate surface cooperating with said rolls to form a pair of valleys in which pieces of fruit may be supported upon adjacent surfaces of said rolls and support, said support being mounted for rotative motion about an axis concentric with its arcuate surface disposed parallel with and below the axes of said rolls, means for imparting oscillatory rotative motion to said support, one direction of which is opposite to the direction of rotation of said rolls, and a barrier disposed in the valley between said support and that one of said rolls whose upper surface travels toward the support whereby to prevent the fruit from being wedged between the approaching surfaces of last mentioned roll and the support.

CHARLES H. LISTER.

CERTIFICATE OF CORRECTION.

Patent No. 2,378,418.   June 19, 1945.

CHARLES H. LISTER.

It is hereby certified that error appears in the printed specification of the above numbered patent requiring correction as follows: Page 2, second column, line 57-58, for the patent number "1,956,023" read --1,946,023--; and that the said Letters Patent should be read with this correction therein that the same may conform to the record of the case in the Patent Office.

Signed and sealed this 9th day of October, A. D. 1945.

(Seal)   Leslie Frazer
First Assistant Commissioner of Patents.